US009785602B1

United States Patent
Mount et al.

(10) Patent No.: US 9,785,602 B1
(45) Date of Patent: Oct. 10, 2017

(54) DEVICE AND METHOD FOR MEASURING, RECORDING AND REPORTING FLUID FLOW

(71) Applicants: Houston Browning Mount, Tulsa, OK (US); John T. Penn, Kinta, OK (US)

(72) Inventors: Houston Browning Mount, Tulsa, OK (US); John T. Penn, Kinta, OK (US)

(73) Assignee: T & T Computer Products, Inc., Tulsa, OK (US)

( * ) Notice: Subject to any disclaimer, the term of this patent is extended or adjusted under 35 U.S.C. 154(b) by 209 days.

(21) Appl. No.: 14/665,773

(22) Filed: Mar. 23, 2015

Related U.S. Application Data

(60) Provisional application No. 61/972,414, filed on Mar. 31, 2014.

(51) Int. Cl.
| | | |
|---|---|---|
| *H05K 7/10* | (2006.01) | |
| *G06F 13/40* | (2006.01) | |
| *G06F 13/42* | (2006.01) | |
| *G06F 9/44* | (2006.01) | |
| *H04L 12/24* | (2006.01) | |

(52) U.S. Cl.
CPC ...... *G06F 13/4081* (2013.01); *G06F 13/4221* (2013.01); *G06F 9/4411* (2013.01); *H04L 41/0213* (2013.01)

(58) Field of Classification Search
None
See application file for complete search history.

(56) References Cited

U.S. PATENT DOCUMENTS

| | | |
|---|---|---|
| 4,418,381 A | 11/1983 | Molusis et al. |
| 4,573,115 A | 2/1986 | Halgrimson |
| 7,039,529 B2 | 5/2006 | Keech |
| 7,299,139 B2 | 11/2007 | Artiuch et al. |
| 7,366,621 B2 | 4/2008 | Sprague |
| 7,725,270 B2 | 5/2010 | Davis |

(Continued)

FOREIGN PATENT DOCUMENTS

| | | |
|---|---|---|
| CN | 102175290 A | 9/2011 |
| CN | 202057370 U | 11/2011 |
| WO | WO2006099342 | 9/2006 |

OTHER PUBLICATIONS

Internet Printout: www.alibaba.com/product-detail/SD-USB-data-memory-water-flow_1954004539.html; SD USB data memory water flow meter flowmeter CE approved.

(Continued)

*Primary Examiner* — Henry Tsai
*Assistant Examiner* — Aurangzeb Hassan
(74) *Attorney, Agent, or Firm* — Dennis D. Brown; Brown Patent Law, P.L.L.C.

(57) ABSTRACT

An electronic flow instrument and method which uses the instrument for monitoring and/or controlling the production or flow of a fluid. The instrument has a multiplexer linked by a USB connection to a microcontroller so that the multiplexer provides multiple USB connection ports for the microcontroller. A resident USB flash drive is installed in one of the USB connection ports for storing long term logging data related to the production or flow of the fluid. Secure access to the electronic flow instrument is provided by using a second USB flash drive containing a security file or password as a security key.

16 Claims, 3 Drawing Sheets

(56) References Cited

U.S. PATENT DOCUMENTS

| | | | |
|---|---|---|---|
| 7,784,361 B2 | 8/2010 | Wiedmann et al. | |
| 7,860,677 B2 | 12/2010 | Artiuch | |
| 7,953,501 B2 | 5/2011 | Zielinski et al. | |
| 8,489,342 B2 | 7/2013 | Dugger et al. | |
| 2008/0088464 A1 | 4/2008 | Gutierrez | |
| 2009/0035121 A1* | 2/2009 | Watson | F01C 1/126 |
| | | | 415/1 |
| 2012/0095602 A1* | 4/2012 | Haller | G05B 19/106 |
| | | | 700/282 |
| 2013/0116837 A1* | 5/2013 | Malaugh | G05B 13/02 |
| | | | 700/284 |
| 2013/0277148 A1* | 10/2013 | Beck | F16N 29/02 |
| | | | 184/6.4 |
| 2014/0069207 A1 | 3/2014 | Leaders et al. | |

OTHER PUBLICATIONS

Internet Printout: http://www.documentation.emersonprocess.com/groups/public/documents/instruction_manuals/d301232x012.pdf; FloBoss Manual; pp. 9-20.

Reese, Charles P.; "Automatic Control of the Wattenberg Gas Field, Colorado; Society of Petroleum Engineers of AIME"; Sep. 1982; US.

"Systems analysis improves pipeline operations. (gas pipelines) (Computer Report: Special OGJ Supplement)"; The Oil and Gas Journal; Mar. 16, 1992; US.

* cited by examiner

DEVICE AND METHOD FOR MEASURING, RECORDING AND REPORTING FLUID FLOW

RELATED CASE

This application claims the benefit of U.S. Provisional Patent Application Ser. No. 61/972,414 filed on Mar. 31, 2014 and incorporates said provisional application by reference into this document as if fully set out at this point.

FIELD OF THE INVENTION

The present invention relates to devices and methods for measuring and recording the volumetric flow of fluids produced from wells or transported in pipelines.

BACKGROUND OF THE INVENTION

Systems known generally in industry as Electronic Flow Meters, or EFMs have been used since as early as the 1970s to measure production of oil and gas from wells and with its transmission through pipelines. A well recognized class of EFM is one that was developed by the Amoco Production Company and known by the product name AMOCAMS. The AMOCAMS EFMs are also described as Remote Terminal Units, or RTUs, because they include the ability to transmit measurement and other information from remote locations by radio or other communication link. EFM is a more general designation and will be used in the rest of this application. These devices have been used in many applications, commonly to aid in automation of the production of gas from a large gas field consisting of many wells.

These systems have enjoyed such success and longevity of use that they have become recognized as a de facto standard in the industry, but they are no longer being manufactured. Many components used in the AMOCAMS EFMs are now obsolete, making repair of damaged units very difficult. However, many users still prefer the AMOCAMS EFMs because of their specific features and capabilities. Additionally, it is cumbersome to combine use of more than one type of EFM in a single application.

It is this circumstance that led the applicants to develop a new EFM using modern components and technology that would be "drop-in" compatible particularly with the AMOCAMS Model 700 EFM, that is, having most or all of the operational features of that unit, and being for all practical purposes identical with regard to communication protocols. This would allow failing AMOCAMS units to be replaced, one at a time, completely transparently to the rest of the field automation system. This, of course, allows for an orderly transition to new equipment instead of having to replace an entire complement of EFMs for a given oil and gas field, or pipeline, at once.

SUMMARY OF THE INVENTION

In the development of this replacement EFM, the applicants have made a number of improvements to the original device that add features, improve ease of operation, and allow completely new types of applications, such as a stand-alone EFM data logger that does not require a data communication link.

In one aspect, an electronic flow instrument is provided comprising: (a) a circuit board; (b) a microcontroller installed on the circuit board; (c) a USB multiplexer installed on the circuit board and electronically connected to the microcontroller, the USB multiplexer providing a plurality of USB connections for the microcontroller, and each of the USB connections comprising a USB socket installed on the circuit board; and (d) one or more flow or process status input connections on the circuit board in electronic communication with the microcontroller.

In other aspects of this instrument, it is preferred that: (i) the microcontroller include an analog to digital converter with a plurality of available inputs therefor; (ii) the microcontroller include a single integral USB port to which the USB multiplexer is connected; (iii) the electronic flow instrument also include a visually readable display which is mounted on the circuit board by a plurality of standoff insulators; (iv) one of the USB sockets installed on the circuit board be positioned beneath the visually readable display; (v) a resident USB flash drive which has backup data stored therein and is in electronic communication with the microcontroller to receive and store long term logging data be installed in the USB socket positioned beneath the visually readable display; (vi) the electronic flow instrument further include two serial ports on the circuit board which are in electronic communication with the microcontroller wherein one of the ports is dedicated to serial data transmission via a data radio and the other port is dedicated to remote display and operation of the electronic flow instrument; and/or (vii) the electronic flow instrument further includes one or more relay connectors on the circuit board in electronic communication with the microcontroller, wherein each of the one or more relay connectors provides a relay contact closure to control a flow or process device.

In another aspect, a method of monitoring the production or flow of a fluid (e.g., a gas, a liquid, or a combination thereof) is provided which comprises the steps of:
 a) delivering one or more status monitoring signals related to the production or flow of the fluid to an electronic flow instrument, the electronic flow instrument comprising a circuit board, a microcontroller installed on the circuit board, and a USB multiplexer installed on the circuit board and electronically connected to microcontroller, the USB multiplexer providing a plurality of USB connections for the microcontroller, and each of the USB connections comprising a USB socket installed on the circuit board;
 b) installing a resident USB flash drive in one of the USB sockets;
 c) storing long term logging data, related to the production or flow of the fluid, in the resident USB flash drive; and
 d) periodically downloading at least a portion of the long term logging data from the resident USB flash drive.

In other aspects of this method, it is preferred that: (i) step (d) comprises connecting a second USB flash drive to a second one of the USB sockets, downloading at least a portion of the long term logging data to the second USB flash drive via the USB connection associated with the second one of the USB sockets, and then removing the second USB flash drive from the second one of the USB sockets; (ii) the method further comprises the step of controlling at least one device (e.g., a valve, a plunger, or a compressor) for the production or flow of the fluid using a relay contact connection on the circuit board which is in electronic communication with the microcontroller; (iii) step (d) comprises transmitting data using a data communication radio which is in electronic communication with the electronic flow instrument via a radio serial port connector provided on the circuit board; and/or (iv) the method further comprise the step of calibrating the electronic flow instrument remotely using a device which is in electronic communication with the electronic flow instrument via a second serial port connector provided on the circuit board.

In another aspect, an electronic flow instrument is provided comprising:
a) a microcontroller;
b) a computer readable storage component which is in electronic communication with the microcontroller;
c) a visual display which is in electronic communication with the microcontroller;
d) a USB socket which is in electronic communication with the microcontroller;
e) a user interface which is in electronic communication with the microcontroller; and
f) a program code for a secure operating system for the electronic flow instrument which is embodied on the computer readable storage component and is readable by the microcontroller to grant access to a user and allow the user to operate the secure operating system for the electronic flow instrument by a method comprising the step of plugging a USB flash drive into the USB socket, the USB flash drive having a security access file, password, or pass code stored therein which is verified by the secure operating system for the electronic flow instrument.

The present invention provides a means for a basic user interface to the EFM that is designed to allow numerous operations without any devices other than a USB flash drive.

A high level interface is also implemented utilizing either a PS/2 keyboard or a USB keyboard and a USB flash drive.

A means is provided that allows use of a single USB port to service two or more USB outlets and devices for various specialized functions.

Another means is provided to allow remote display and operation of the EFM when necessary due to particular physical aspects of the unit installation.

The prior art AMOCAMS 700, when installed in a field enclosure, consists of a number of circuit boards and sub-assemblies with associated connecting cables. When the inventive EFM is installed to replace the AMOCAMS unit, six separate circuit boards and many cables are eliminated in a typical installation.

DETAILED DESCRIPTION OF THE PREFERRED EMBODIMENTS

The implementation of the present invention is an EFM designed around a 16 bit microcontroller manufactured by Microchip Technology Inc. The equivalent of much of what required 5 or 6 circuit boards of components in the original AMOCAMS EFMs is actually contained within a single integrated circuit designated as a PIC24FJ256GB210. There are numerous other microcontrollers that might be suitable, depending on desired functionality. The EFM is typically powered by a combination of a 12 volt rechargeable battery and a solar panel, since most well sites do not have commercial electric power available.

Block Diagram

Figure 1:
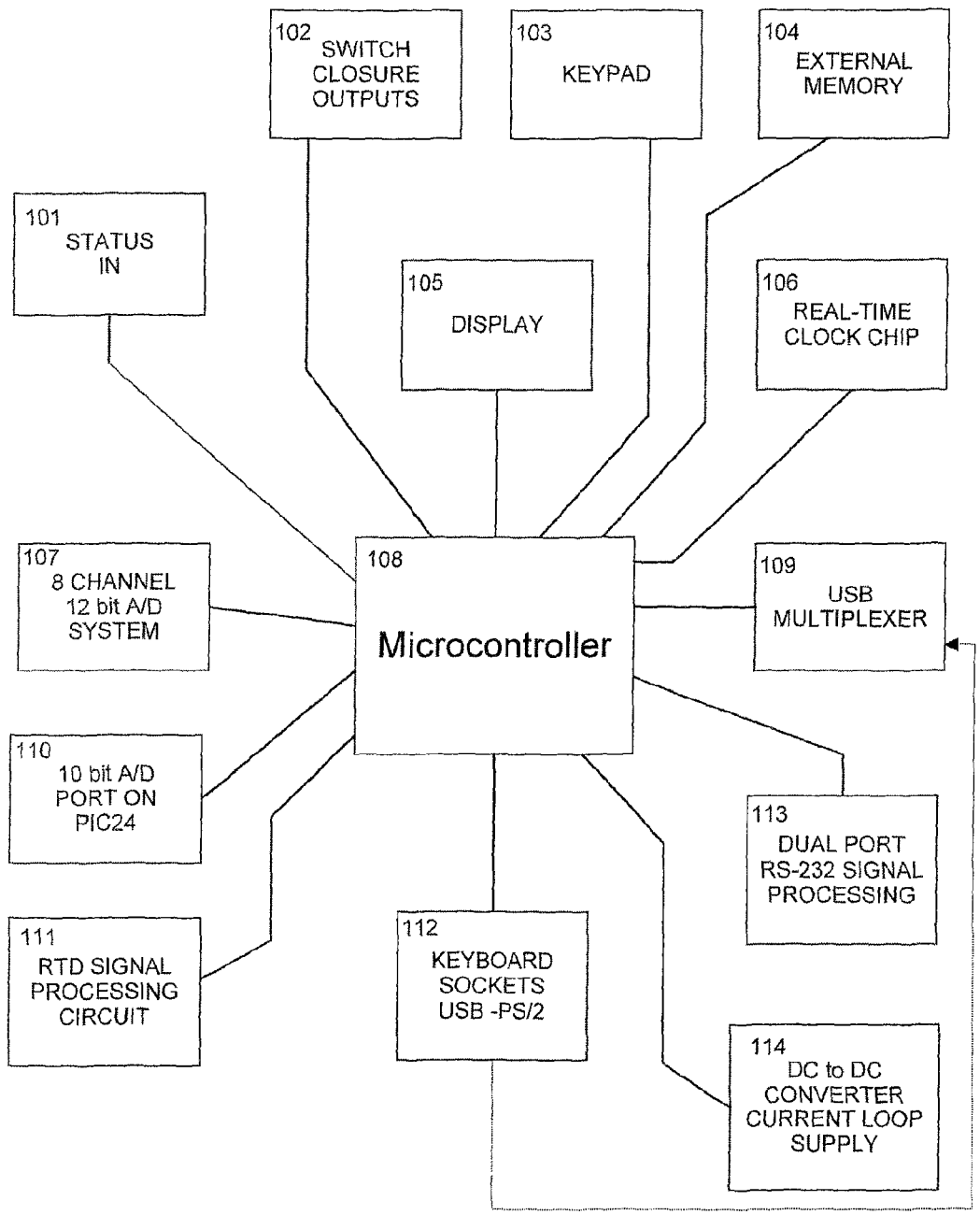
FIG. 1 is a block diagram of an EFM built on a single circuit board and providing all of the most common functions of an AMOCAMS EFM and improvements.

A block diagram of the primary elements of the EFM are shown in FIG. 1, starting from the block at the upper left and going clockwise as follows:

Status inputs 101—this block includes signal processing and electrical isolation for a number of status monitoring signals that may be connected to any desired device that might be of interest on the wellsite or pipeline, such as tank levels, status of a compressor (running or not, for instance), that may be used on the well, valve positions, or any of a number of safety devices that may be used at the location.

Switch outputs 102—this block contains driver circuits and relays to provide isolated relay contact closures to control anything that the operator may desire, such as valve motors, plunger controls or other devices.

Display 105—this is an LCD, LED or similar character display, typically 4 by 20 characters in size that is used to display all of the relevant well production data for easy observation by the well maintenance personnel (commonly called 'pumper').

Keypad 103—this block includes a simple set of push-button switches that can be used by pumper personnel for routine operations including downloading of data and some adjustments to measurement parameters, such as plate (or orifice) size when it is necessary to make mechanical changes to the measurement equipment.

External memory 104—this is a block comprised of a combination of volatile and non-volatile high speed memory. It is used to store various data including configuration information and all of the logging information for later downloading or transmission. The volatile memory power is backed up by a lithium oxide battery.

Real-time clock chip 106—this is a real-time clock and calendar integrated circuit that is also backed up by the lithium oxide battery in case primary power should fail.

USB multiplexer 109—Microcontrollers commonly only offer a single USB port. Expansion to multiple USB ports is normally done by addition of a device called a "hub". The hardware associated with a hub adds considerable complexity to the system design and requires an additional level of USB driver support. This requires too much program space to be practical in a typical microcontroller.

The block labeled USB multiplexer 109 contains a single integrated circuit that allows connection of any one of up to four separate USB sockets to the PIC24. Control of two logical inputs to the multiplexer allows very easy program control of which socket is active with almost no additional hardware or software required. These ports can be used for various purposes, such as security access control, downloading various data to USB data storage devices, USB full function keyboards or other USB devices. This is a very low cost solution to the potentially expensive and complicated problem of providing multiple USB ports on the EFM.

A particular beneficial use of the various USB ports is for storage of measurement and configuration data to a resident USB flash drive, and occasional downloading of that data to a removable USB mass storage device, typically also a flash drive. This allows use of the EFM as a data logging device of practically unlimited capacity for many applications where a data communication link is not available. In addition to data logging, this capability also allows easy access to detailed data not usually collected in RTU like applications, as described above. This can be very useful for troubleshooting well or system problems where standard data collection is too general.

Dual port RS-232 signal processing 113—this includes signal conditioning circuitry for conventional serial RS-232 or similar devices. It can also be easily configured for RS-485 devices, if desired. One port is typically dedicated to serial data transmission via commercially available battery operated UHF data radios commonly used in RTU applications. The other port may have multiple uses, such as remote displays or remote terminal devices used to simplify calibration of the EFM when the sensors used are more than 10 feet or so from the EFM itself.

DC/DC converter current loop supply 114—this circuit provides isolated DC voltage, typically 24 volts, that is required for many of the current loop type transducers used to measure the various parameters that are used to calculate flow rates for the well. This circuit can be enabled or disabled as needed by program control with the PIC24. It is also configurable for other voltage requirements.

Keyboard sockets USB or PS/2 112—this circuit includes signal conditioning to allow the PIC24 to interface with any standard PS/2 or USB type keyboard. This would typically be used by a field instrument specialist for detailed configuration when installing an EFM, or when doing a periodic calibration of the device. A laptop computer is not required in the field to install or calibrate this unit, as is typical of other available EFMs. Detailed configuration information can be stored on a USB flash drive and is easily downloaded to the EFM in the field. The USB keyboard connection is made through the USB multiplexer described above.

10 bit A/D port on PIC24 110—the PIC24 has on chip a 10 bit analog to digital converter that has as many as 16 inputs available. This block includes signal processing circuitry to allow measurement of temperature of the fluid flowing through the metering device by a resistive temperature device or RTD. It also includes circuits to monitor the temperature on the circuit board of the EFM, the main battery supply voltage, and the backup battery supply voltage.

8 Channel 12 bit A/D system 107—this circuit includes an eight channel 12 bit analog to digital converter that connects to the PIC24 through a high speed serial interface. It can be individually configured to measure up to eight analog inputs in either 4-20 ma current loop or 0-2.5 volt mode. These are the high-resolution measurements used to calculate the flow rate of the fluid once every second which is also integrated into per hour, per day and per month summing registers in the PIC24.

Microcontroller 108—this is the primary digital processing unit for the EFM.

Physical Layout

Figure 2:
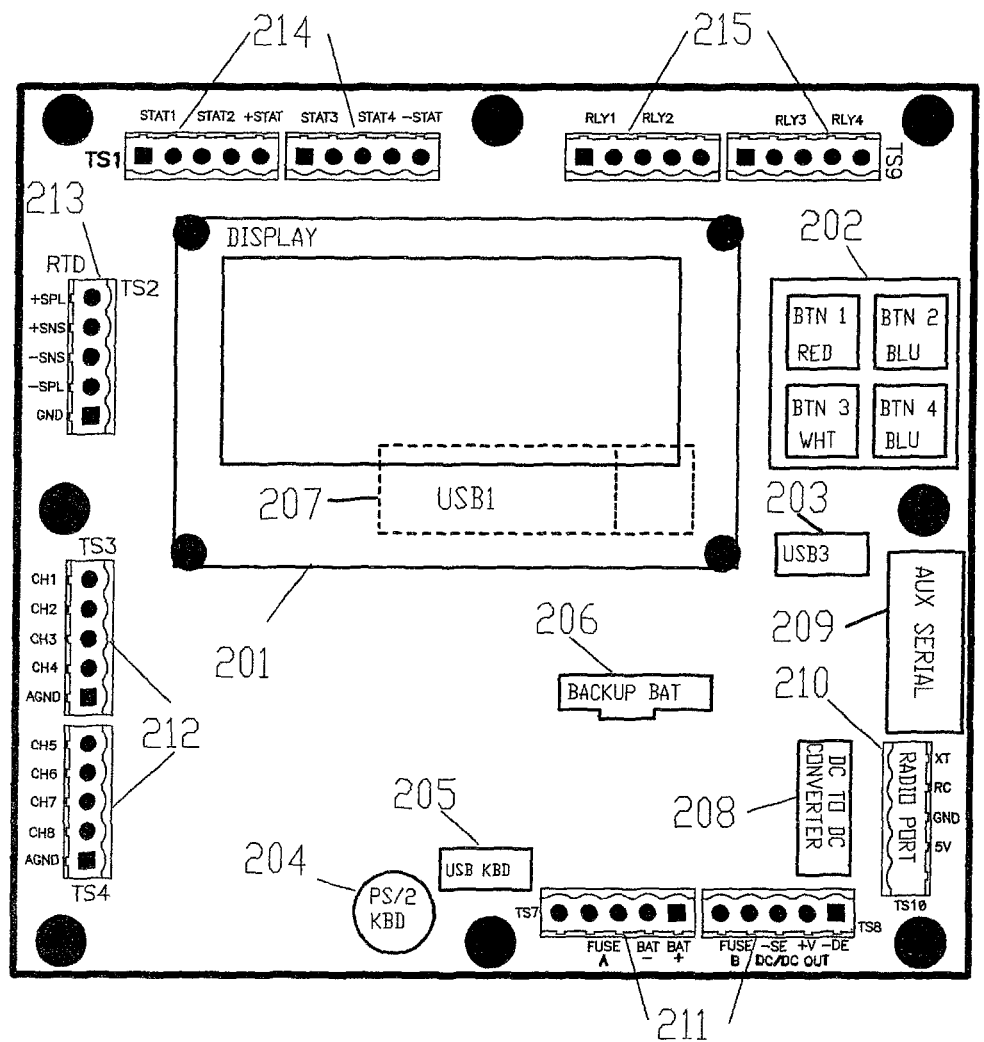
FIG. 2 is a drawing of the physical layout of the device showing the components used to implement the basic user interface. Also shown are components used with the advanced interface used for installation configuration and maintenance.

FIG. 2 is a drawing depicting a typical arrangement of the circuit board of the EFM with components that are pertinent to the description of the operation of the device. This arrangement is designed for easy use of the device, but can be accomplished in many other configurations.

As it is depicted here, the display 201 referred to in the description of FIG. 1 is located toward the top of the circuit board. Indicated in dashed lines directly behind the display is a horizontally oriented USB socket (labeled USB1) and space for a USB flash drive 207.

Immediately to the right of the display is a four-button keypad 202. The keys are color coded red, white and blue to relate to various functions. The red button is designated BTN 1, the white button is BTN 3, while the top and bottom blue buttons are designated BTN 2 and BTN 4, respectively.

Just below the keypad is a vertically oriented USB (labeled USB3) socket 203. Immediately to the right and below the USB socket is a 9-pin connector 209 of the type typically used for serial port connections on computing hardware.

The auxiliary serial connector 209 is near the middle right side of the unit. This connector is multi-purpose, allowing connection to displays, terminals or other serial devices.

The radio port connector 210 is at the lower right side of the board and is normally used to connect to a data communication radio or other serial communication line.

At the bottom of the board in the center are two sockets that will accept standard computer keyboard plugs. One is a PS/2 type socket 204 and the other is a USB socket 205.

Below the display and slightly right is a socket 206 for a common lithium type button battery that is used to continue to power a real-time clock calendar device and some of the external memory devices if main battery power should fail.

Arranged around the remaining perimeter of the board are a number of 5 position screw terminal connectors, which allow easy access for connecting various sensors, auxiliary inputs and outputs, radios, and power to the device. Power connectors 211 are at the bottom right. Analog input channels 212, which are configurable for either voltage or current loop input, are on the lower left side. The RTD connector 213 allows direct connection of a resistive type temperature sensor. General purpose status inputs 214 connect at the top left of the board. Relay contact connections 215 are at the top right.

Functional Description

The PIC24 microcontroller includes a single integral USB port. A preferred embodiment of the invention makes extended use of this single port by the addition of a low cost multiplexing device (MUX). The MUX is used to allow the single USB port to be used to selectively connect to any one of several different USB sockets under program control.

The socket designated USB1 in the above description is hidden behind the display, which is mounted on standoff insulators. This hidden socket accepts a USB flash drive that is normally left in place and is used for data backup and long term logging data storage. A commonly available flash drive provides potentially years of data storage capacity.

USB2 is the socket nearest the PS/2 socket marked KBD and is used to allow connection of a USB type keyboard as an alternative to using a PS/2 type keyboard. This flexibility affords the EFM compatibility with many readily available keyboards.

The MUX can also be switched to the USB3 socket for use with any mass storage USB device, typically a pocket sized flash drive. A storage device plugged in this socket is used as both a security control system and as a receptacle for downloading various kinds of measurement and configuration data directly from the EFM, or uploading configuration data to the EFM.

Figure 3:
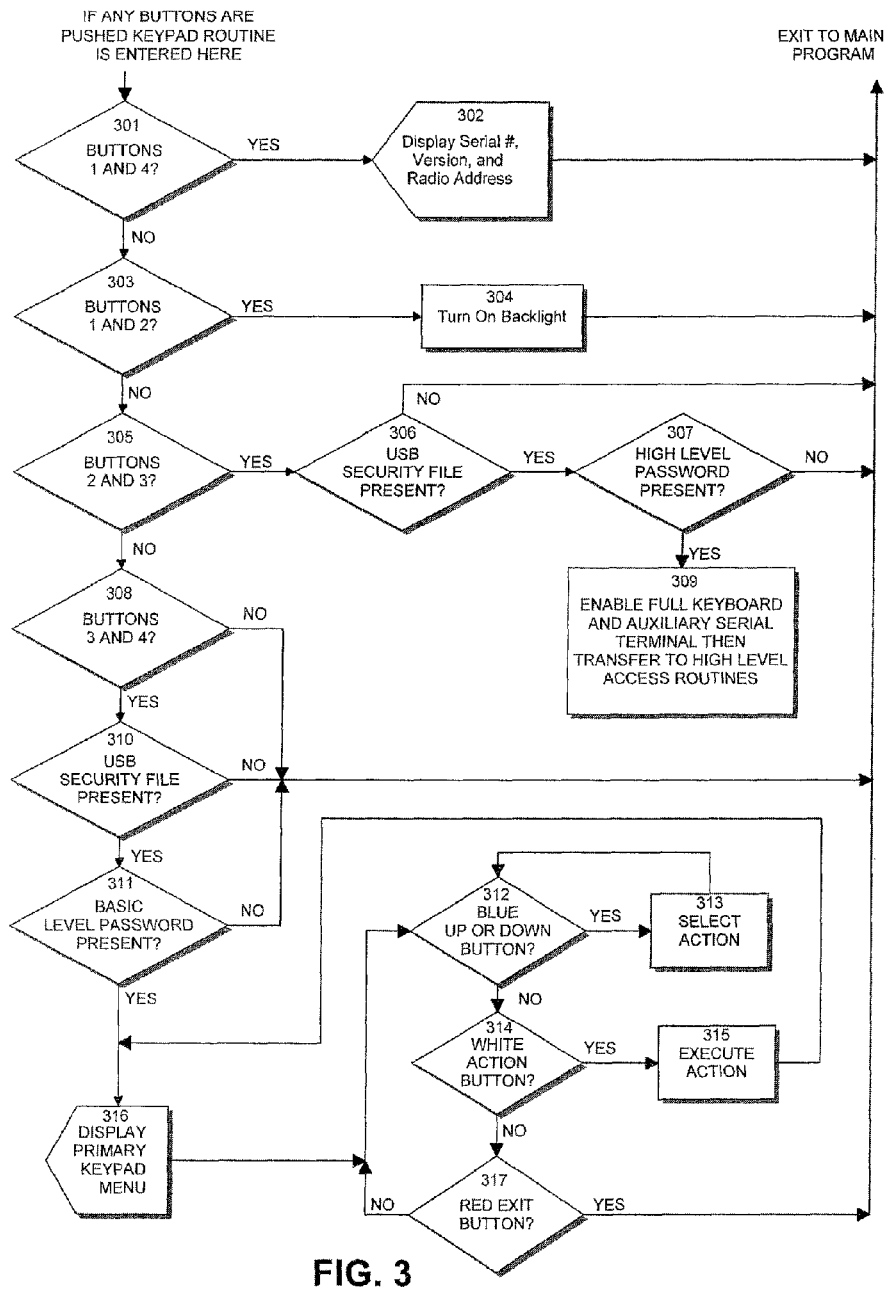
FIG. 3 is a flow chart outlining the logical flow of the software used to create the basic user interface that allows many useful operations to be accomplished with nothing other than a pocket sized USB flash drive.

A preferred embodiment of the keypad interface will allow some basic, but very useful actions to be taken without requiring additional equipment or a specialized service technician. Some of these functions require that a security key comprised of a flash drive with a security file containing a password be plugged into the USB3 socket. FIG. 3 is a flowchart of the general function of the keypad interface.

Entry to the keypad user interface is initiated by simultaneously pressing a combination of buttons to accomplish specific functions. There are two functions that do not require the security key. Simultaneously pushing the combination of the #1 and #4 buttons 301 will interrupt the normal display to display the EFM serial number, software version number and the radio address number if a data radio system is used 302. Simultaneously pushing the combination of #1 and #2 303 will turn on the display backlight for a short duration 304 to allow the display to be read in dark or low light conditions.

Access to additional functions requires that the user first plug in the security key described above to the USB3 socket. If there is a password file containing a password for high level access present, simultaneously pressing #2 and #3 buttons 305 will enable the PS/2 full keyboard interface for use 309, typically by a field technician for routine calibration or other maintenance functions.

In addition, the-auxiliary serial port is enabled to allow use of a remote serial terminal 309, connected either by wire or by radio link. This is a convenient feature if the sensors and valves used in calibration procedures are an impractically long distance to use the PS/2 keyboard and on-board display. It should be noted that the serial port is normally enabled for use of a remote display that will mirror the display shown on the EFM on-board display. The auxiliary serial port can also be configured to communicate with sensors or other serial devices. If only the basic access file and password are present, the user then should simultaneously push the #3 and #4 buttons 308 which will then switch the unit into the keypad menu mode.

In the menu mode, a number of items are shown on the display 316 at one time. Use of the keypad buttons is as follows: BLUE buttons are the up and down buttons used to select the desired action from the menu list. The top BLUE button moves the item selection up and the bottom BLUE button moves the item selection down 312. The selected item is indicated by a flashing cursor at the beginning of the selected line. WHITE is the action button that executes the selected action 314. The RED button is the exit button, used to exit the keypad user interface without changes 317.

One adjustment that may need to be made to the EFM by regular field personnel is to change what is known as the "plate size" specification (actually the size of the orifice in the plate). This is an action that becomes necessary when there has been some significant change in flow rate from the well or through the pipeline being measured. To do this, the user would first enter the menu mode of operation by the process described in the above paragraphs. He would then press the appropriate BLUE buttons to select the "PLATE CHANGE" option. Pushing the WHITE action button then puts the display in the "PLATE CHANGE" mode, displaying the EFM's current plate size setting and a new size, which starts at the same size as the current size. The BLUE buttons can then be used to increase or decrease the plate size by incremental steps. The WHITE button is used to exit the increment mode when desired and options will be displayed to either save the final selection (WHITE button again), or exit without changing the plate size.

An additional feature of the software is that as the plate size is adjusted, calculations are made to determine if the currently displayed new size is within the optimum range of sizes to result in accurate flow measurement. If the selected size is out of range the display will indicate "OUT OF BETA" (BETA is a variable used in the AGA-3 calculation method for determining flowrate) next to the selection. This is an advisory warning and does not prevent final selection of the out of range size.

Another action that may need to be taken by field personnel is to download a block of data from the EFM into the flash drive that is already plugged into the USB3 socket. To do this he would select the "DOWNLOAD DATA" function with the BLUE and WHITE buttons as described previously.

The action items displayed present the options to download the previous days data, the previous weeks data, and all data. When executed with the WHITE button a directory named with the EFM location name is created in the flash drive if it does not already exist; then the appropriate data is downloaded to the flash drive in that directory.

The data is downloaded as a number of file types in three separate formats, one a columnar formatted ASCii file with a file type of ".txt", and a matching file in CSV (comma separated variable) format with a file type of ".csv". CSV files are particularly convenient for the data user, as they will load directly into any spreadsheet program, ready to view, including column headings. The third format is encoded for security so that it cannot be easily altered. The types of files downloaded include: snapshot log—25 hrs of 10 min data; audit log—33 days of 60 minute data; day log—40 days of daily closeout data; month log—14 months of monthly closeout data; flow-time log—40 days of flow-time per day in hours, minutes, and seconds; and event log—the last 119 event records.

Most of the types of logs contain generally similar data, but in differing time resolutions, with the exception of the event log. The event log is event driven, rather than time driven, and includes entries for various types of reboot procedures, calibration procedures and other such system information. It will include entries for changes in calibration for any of the analog input channels, including the RTD channel, changes in pipe size, plate size or related variables, and it will make an entry for any time that data is downloaded to a flash drive.

Yet another useful action that can be taken with the keypad interface is to reset the clock and calendar. This may be necessary due to a combination of main and backup battery failure that corrupts the EFM's digital clock. The "CLOCK SET" function is selected as above, with the BLUE and WHITE buttons. A series of displays will then allow up/down selection of the year, month, day, hour, minute and second settings, finally executed with the WHITE button, or exiting without change with the RED button.

The EFM system design uses high performance non-volatile memory to store all of its critical configuration and measurement data so that regular field personnel can restart a system with dead main and backup batteries by simply replacing the batteries and resetting the system clock with the keypad interface. This will restart the EFM into normal operation. All measurement data up until the time the batteries failed will be retained and the only flow data lost will be that when the unit was actually off. Other EFM designs typically require specialized service personnel and equipment to accomplish this procedure. This functional ability represents a significant saving in maintenance costs for the operator.

There are many other ways to program functions that can be added or rearranged from those described here without deviating in substance from the invention described. Similarly, it is obvious that one skilled in the art could create variations of the described inventions without departing from the essential concepts of these inventions, and all such variations are intended to be included within the scope of the description of these inventions.

Thus, the present invention is well adapted to carry out the objects and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed is:

1. An electronic flow instrument comprising:
   a circuit board;
   a microcontroller installed on the circuit board;
   a multiplexer, installed on the circuit board, which is separate from the microcontroller and is electronically connected to the microcontroller via a single electronic connection between the multiplexer and the microcontroller;
   a plurality of separate USB sockets installed on the circuit board, wherein the separate USB sockets installed on the circuit board are separate from the microcontroller, each of the separate USB sockets has a separate electronic connection to the multiplexer, and the multiplexer includes an integrated circuit which allows the separate USB sockets to be selectively activated for electronic communication of each of the separate USB sockets which has been selectively activated with the microcontroller through the multiplexer and through the single electronic connection between the multiplexer and the microcontroller;
   one or more flow or process status input connections on the circuit board in electronic communication with the microcontroller; and
   a resident USB flash drive which is installed in one of the separate USB sockets and is retained in said one of the separate USB sockets during the operation of the electronic flow instrument so that the resident USB flash drive continuously receives and stores measurement and logging data of the electric flow instrument on a real time basis.

2. The electronic flow instrument of claim 1 wherein the microcontroller includes an analog to digital converter with a plurality of available inputs therefor.

3. The electronic flow instrument of claim 1 wherein the microcontroller includes a single integral USB port to which the single electronic connection between the multiplexer and the microcontroller is connected.

4. The electronic flow instrument of claim 1 wherein:
   the electronic flow instrument further comprises a visually readable display which is mounted over an outer surface of the circuit board by a plurality of standoff insulators such that the visually readable display is separated from the outer surface of the circuit board to form a space beneath the visually readable display between the visually readable display and the outer surface of the circuit board;
   said one of the separate USB sockets having the resident USB flash drive installed therein is installed on the face of the circuit board beneath the visually readable display in the space between the visually readable display and the outer surface of the circuit board; and
   the resident USB flash drive is covered and hidden from direct frontal view by the visually readable display.

5. The electronic flow instrument of claim 1 further comprising two serial ports on the circuit board which are in electronic communication with the microcontroller, wherein:
   one port of the two serial ports is dedicated to serial data transmission via a radio and
   a second port of the two serial ports is dedicated to remote display and operation of the electronic flow instrument.

6. The electronic flow instrument of claim 1 further comprising one or more relay connectors on the circuit board in electronic communication with the microcontroller, wherein each of the one or more relay connectors provides a relay contact closure to control a flow or process device.

7. The electronic flow instrument of claim 1 further comprising:
   a computer readable storage component, different from the resident USB flash drive, which is in electronic communication with the microcontroller;
   a visual display, installed on the circuit board, which is in electronic communication with the microcontroller;
   a user interface, installed on the circuit board, which is in electronic communication with the microcontroller; and
   a program code for a secure operating system for the electronic flow instrument which is embodied on the computer readable storage component and is readable by the microcontroller to grant a user access to and allow the user to operate the secure operating system for the electronic flow instrument by a method comprising the step of plugging a second USB flash drive, different from the resident USB flash drive and different from the computer readable storage component, into a second one of the separate USB sockets wherein the second USB flash drive has a security access file stored therein which includes a password or pass code which is verified by the secure operating system for the electronic flow instrument.

8. The electronic flow instrument of claim 7 wherein the method further comprises the step of entering a code using the user interface to cause the secure operating system for the electronic flow meter to verify the password or pass code.

9. The electronic flow instrument of claim 7 wherein, upon verification of the password or pass code, the secure operating system provides a menu of operational items on the display and the method further comprises the step of using the user interface to select one of the operational items.

10. The electronic flow instrument of claim 9 wherein:
   the electronic flow instrument measures a flow rate of a fluid flowing through a flow line using a first orifice plate removably installed in the flow line, the first orifice plate comprising a metal plate having an orifice of a first size therethrough;
   one of the operational items is for entering a replacement of the first orifice plate with a second orifice plate having a flow orifice of a new size which is different from the first size; and
   the method further comprises the steps of using the user interface to select the item for entering a change in size of an orifice of an orifice plate and then using the user interface to enter the new size of the flow orifice of the second orifice plate.

11. The electronic flow instrument of claim 10 wherein the user interface is a 4 button key pad.

12. A method of monitoring the production or flow of a fluid using the electronic flow instrument of claim 1, the method comprising the steps of:
   continuously receiving and storing measurement and logging data for the production or flow of the fluid in the resident USB flash drive on real time basis and
   periodically connecting a second USB flash drive to a second one of the USB sockets, downloading the measurement and logging data from the resident USB flash drive to the second USB flash drive, and then removing the second USB flash drive from said second one of the USB sockets.

13. The method of claim 12 further comprising the step of controlling at least one device for the production or flow of the fluid using a relay contact connection on the circuit board which is in electronic communication with the microcontroller.

14. The method of claim 13 wherein the device is a valve, a plunger, or a compressor.

15. The method of claim 12 wherein the step of continuously receiving comprises receiving data from a data communication radio which is in electronic communication with the electronic flow instrument via a radio serial port connector provided on the circuit board.

16. A method of monitoring the production or flow of a fluid using the electronic flow instrument of claim 7 wherein the resident USB flash drive and the computer readable storage component are each non-volatile memory components, the electronic flow instrument further comprises a real time clock, and the method comprises the steps of:

storing configuration data on the computer readable storage component;

continuously receiving and storing measurement and logging data for the production or flow of the fluid in the resident USB flash drive on real time basis;

when electrical power is lost from all main and backup batteries for the electronic flow instrument, retaining the configuration data in the computer readable storage component and retaining the measurement and logging data, up to the point at which the electrical power was lost from the main and backup batteries, in the resident USB flash drive; and restarting the electric flow instrument with the configuration data retained, and with the measurement and logging data retained up to the point at which the electrical power was lost, by only replacing the main battery and/or the backup battery and resetting the real time clock.

\* \* \* \* \*